United States Patent [19]

Ogata et al.

[11] Patent Number: 4,911,969
[45] Date of Patent: Mar. 27, 1990

[54] DECORATIVE SHEET AND METHOD OF MANUFACTURING THE SAME

[75] Inventors: Tomohide Ogata; Hironao Nagashima; Ritsuo Iwata; all of Hamamatsu, Japan

[73] Assignee: Yamaha Corporation, Hamamatsu, Japan

[21] Appl. No.: 184,449

[22] PCT Filed: Jul. 9, 1987

[86] PCT No.: PCT/JP87/00487

§ 371 Date: Mar. 9, 1988

§ 102(e) Date: Mar. 9, 1988

[87] PCT Pub. No.: WO88/00134

PCT Pub. Date: Jan. 14, 1988

[30] Foreign Application Priority Data

| Jul. 9, 1986 | [JP] | Japan | 61-161564 |
| May 14, 1987 | [JP] | Japan | 62-117522 |
| May 25, 1987 | [JP] | Japan | 62-127341 |
| May 28, 1987 | [JP] | Japan | 62-132338 |
| Jun. 16, 1987 | [JP] | Japan | 62-149599 |
| Jul. 6, 1987 | [JP] | Japan | 62-168114 |

[51] Int. Cl.$^4$ .............................................. B32B 3/14
[52] U.S. Cl. ........................... 428/67; 428/535; 428/537.1
[58] Field of Search ............... 428/67, 106, 114, 537.1, 428/109, 535

[56] References Cited

U.S. PATENT DOCUMENTS 1,900,830  3/1933  Mahlstedt et al. ............... 428/537.1
4,122,236  10/1978  Holman ............................. 428/537.1

FOREIGN PATENT DOCUMENTS

*895524  11/1953  Fed. Rep. of Germany .
1144159  2/1963  Fed. Rep. of Germany .
2455425  5/1976  Fed. Rep. of Germany .
51-47601  12/1976  Japan .
56-4427  1/1981  Japan .
56-11239  2/1981  Japan .

Primary Examiner—Alexander S. Thomas
Attorney, Agent, or Firm—Hoffmann & Baron

[57] ABSTRACT

A decorative board has a small timber dispersed, colored, opaque resin layer in which a multiplicity of small timber pieces are dispersed, the small pieces of timber in this layer are exposed on the surface of the layer, and the surface of the layer is flat. In addition, a transparent resin layer or a glass fiber-mixed, transparent resin layer is provided on the small timber piece-dispersed, colored, transparent resin layer, or the small timber piece-dispersed, colored, opaque resin layer is provided on a substrate. Consequently, a beautiful decorative board can be provided in which the side surface of the small timber pieces exposed to the surface of the small timber piece-dispersed, colored opaque resin layer are arranged and disposed parallel with the surface of the decorative board, the figure patterns of the small timber pieces appear on the surface of the decorative board effectively without waste, and the figure patterns are thus emphasized.

9 Claims, 4 Drawing Sheets

DECORATIVE SHEET AND METHOD OF MANUFACTURING THE SAME

TECHNICAL FIELD

The present invention relates to wood-based decorative boards suitable for use as wooden fittings such as tables, counters, furniture, and acoustic apparatus cases, wood-based construction materials such as floor materials and wall materials, and surface materials such as vehicle fittings as well as to a method of production thereof.

BACKGROUND ART

Hitherto, known surface materials used as surface plates of such as tables include timber alone and those in which thin wooden sheets are bonded to plywood base plates. Surface materials of this type have advantages in that they not only have a beautiful appearance of lumber but also are soft-touching. However, they have disadvantages in that they lack abrasion resistance, water resistance, and stain resistance and are unsatisfactory in terms of durability.

In addition, timber itself, which has beautiful figure patterns and can be used as surface materials, is getting depleted as resources and is becoming difficult to obtain.

For these reasons, it has been proposed to use as a surface material one which is obtained by mixing a multiplicity of small timber pieces in a solution of a transparent hardenable resin such as unsaturated polyester resin, molding the mixture into a plate-like shape and allowing it to harden.

With such surface materials, however, there are many cases where the side surfaces of the small timber pieces and the surface of the decorative board are not parallel with each other, since the materials are obtained by mixing and hardening a resin solution and small timber pieces, so that there has been felt a dissatisfaction that the surface patterns of the small timber pieces do not efficiently appear in the surface of the decorative board, and the beauty of the small timber pieces does not appear sufficiently.

DISCLOSURE OF INVENTION

Accordingly, an object of the present invention is to provide beautiful decorative boards in which the figure patterns of small timber pieces appear in the surfaces thereof effectively without waste and the figure patterns are emphasized as well as a method of production thereof.

In consideration of this object, the present invention provides a decorative board comprising a colored, opaque resin layer with a multiplicity of small timber pieces dispersed therein, wherein the small timber pieces in the colored, opaque resin layer are exposed on the surface of the layer, and the layer is flat. By adopting this structure, the side surfaces of the small timber pieces exposed on the surface of the small timber piece-dispersed, colored, opaque resin layer are arranged and disposed parallel with the surface of the decorative board, so that the figure patterns of the small timber pieces can appear effectively on the surface of the decorative board, and the decorative board can be made beautiful with their figure patterns emphasized.

In accordance with claims 2 and 3, a transparent resin layer is formed on the colored, opaque resin layer with a multiplicity of small pieces of timber are dispersed therein. This transparent resin layer protects the small timber piece-dispersed, colored, opaque resin layer, which prevents the absorption of moisture and water by the small timber pieces, as well as staining, abrasion and the like of the surface of the small timber piece-dispersed, colored, opaque layer.

In accordance with claim 4, a transparent resin layer having glass fibers mixed therein is provided on a colored, opaque resin layer with the small timber pieces dispersed therein. By virtue of the presence of this transparent resin layer in which the glass fibers are mixed, movement caused as by the absorption and desorption of moisture by the small pieces of timber in the small timber piece-dispersed, colored, opaque resin layer and movement caused as by hardening and shrinkage of the colored, opaque resin layer and temperature changes do not appear on the surface of the transparent resin layer, the surface becomes smooth, and its beauty is enhanced.

According to claims 9 to 11, there are provided methods of producing decorative boards described in claim 1. In particular, in accordance with the methods of production provided by claims 10 and 11, it is possible to reduce the amount of small timber pieces used since small timber pieces can be made to concentrate on the surface of the colored, opaque resin layer.

According to claims 12 to 14, there are provided methods of producing decorative boards having transparent resin layers shown in claims 2 and 3. A method in which a transparent paint is applied, a method in which a transparent resin film or a transparent resin sheet is bonded, or a similar method are available in forming the transparent resin layer.

According to claims 17 to 19, there are provided methods of producing decorative boards having a transparent resin layer with glass fibers mixed therein which is provided according to claim 4. As for the form of the glass fibers, it is preferable to use a thin glass mat such as a surface mat so that the presence thereof will not be visually recognized.

Furthermore, according to an embodiment described in claim 5, those subjected to dimension stabilization treatment are used as the small timber pieces. In the case of the small timber pieces subjected to dimension stabilization treatment, the moisture absorption and expansion of the small pieces of timber are prevented, and the affinity between the small timber pieces and the colored, opaque resin is increased, with the result that the adhesiveness therebetween is enhanced, and the small timber pieces can be prevented from falling off therefrom.

According to an embodiment described in claim 6, those timber pieces in which coloring treatment is effected to at least the peripheral surfaces of the small pieces, preferably to the inside thereof, are used as the small timber pieces. As a result of the coloring treatment, the types, quality, etc. of the small timber pieces that can be used are expanded; it is possible to utilize small timber pieces taken from material wood whose types of color tone are limited in variation, and, further, it is possible to impart an impression of high quality to the decorative board product.

According to an embodiment described in claim 7, it is possible to use a thermosetting resin as a resin constituting the colored, opaque resin layer. As a result of selecting the thermosetting resin, the range of available types of resin solutions which are liquid at room temperature can be expanded, so that production is facilitated. In addition, the heat resistance and mechanical strength of the decorative board products can be enhanced.

BRIEF DESCRIPTION OF DRAWINGS

The preferred embodiments of the present invention will be described with reference to the accompanying drawings, in which:

FIGS. 1 and 2 illustrate a first embodiment of a decorative board in accordance with the present invention; in which

BEST MODE FOR CARRYING OUT THE INVENTION

Figure 1:
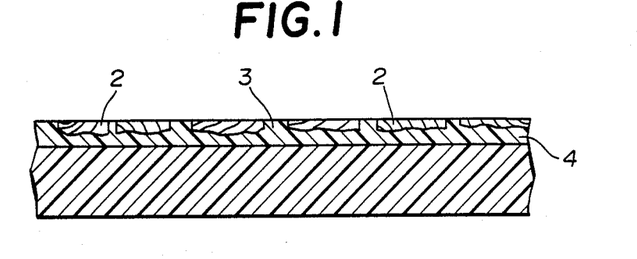
FIG. 1 is a schematic cross-sectional view.
Figure 2:
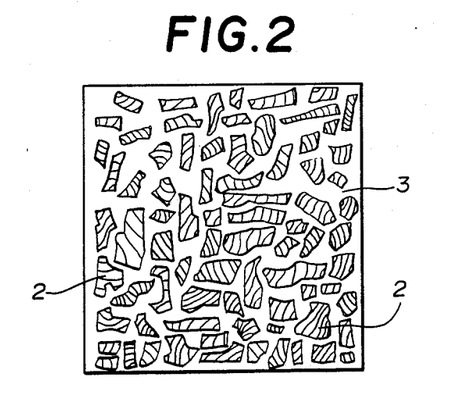
FIG. 2 is a top plan view.

FIGS. 1 and 2 illustrate basic embodiments of a decorative board in accordance with the present invention. In FIG. 1, reference numeral 1 denotes a substrate. As the substrate 1, woody materials such as lauan plywood, particle board, lumber core board, and solid material as well as resin-type materials such as fiber-reinforced synthetic resin boards may be used, and although it is not particularly restricted, the thickness of the substrate is normally 2 to 30 mm, preferably 5 to 10 mm or thereabout.

Disposed on the substrate 1 and integrally therewith is a small timber-dispersed, colored, opaque resin layer 4 obtained by dispersing a multiplicity of small pieces of timber 2 in a colored, opaque resin 3. As the small timber pieces 2 forming the resin layer 4, it is possible to use small timber pieces, including broad-leaf trees such as ebony wood, beech, Japanese oak, horse-chestnut, kalopanex, shelf, maple, birch, and oak as well as needle-leaf trees such as Japanese cryptomeria, Japanese cypress, pine, spruce, and agathis. Although their configurations are not particularly restricted, it is possible to use small pieces of various configurations, such as those formed into a tabular shape, rectangular parallelopiped shape, cubic shape, or granular shape by cutting, and those formed by crushing these small pieces by mechanical impact or pressurization with a roll. If their shape is made into a rectangular parallelopiped, the small pieces 2 are desirably flat with the size thereof ranging from a width of 3 to 7 mm, preferably 5 to 6 mm, a length of 3 to 20 mm, preferably 12 to 20 mm, and a thickness of 0.2 to 3 mm, preferably 0.2 to 1 mm, to a width of 20 to 25 mm, a length of 20 to 100 mm, preferably 30 to 60 mm, and a thickness of 0.2 to 3 mm, preferably 0.2 to 1 mm. If their shape is cylindrical, the diameter is desirably set up to 5 to 100 mm, and the thickness to 0.2 to 5 mm or thereabouts. In the case of crushed pieces, they are desirably set up to have a width of 1 to 4 mm, a length of 3 to 30 mm, preferably 5 to 30 mm, and a thickness of 0.2 to 3 mm, preferably 0.2 to 1 mm or thereabouts. In addition, as for the small timber pieces 2, those of different types of wood and those having different color tones may be mixed among them. Furthermore, as for the small timber pieces 2, it is possible to use those subjected to dimension stabilization treatment, if necessary. The dimension stabilization treatment includes acetylation treatment in which the small pieces of timber are treated with acetic anhydride, a method in which they are immersed in polyethylene glycol or polypropylene glycol, a method in which they are immersed in a solution of a hardenable resin such as a liquid phenol resin, unsaturated polyester resin, epoxy resin, silicone resin, urethane resin, or modified acrylic resin and are allowed to harden, and a similar method. It is also possible to mix organic halogen-based antiseptics with polyethylene glycol or a liquid resin, and to effect the dimension stabilization treatment and the antiseptic treatment at the same time.

In addition, as for the small timber pieces 2, it is possible to use those which are partially or wholly subjected to coloring treatment to one or more than two kinds of color tone. However, it is also preferable to make use of the natural color of timber, such as the black color as of ebony wood, the yellow color as of rengas and Padouk, and the white color as of oak and beech. The coloring treatment includes a method in which a multiplicity of small pieces of timber are immersed in a coloring solution containing a coloring agent such as dyestuff or pigment dissolved in water or a solvent such as an organic solvent in a coloring agent concentration of 0.1 to 10 wt. %, or a like method. It is possible to accelerate the infiltration of the coloring solution by heating it to effect coloring with a deep color. At this time, it is possible to control a coloring state by selecting the type of coloring agent, the period of immersing time, temperature, pressure, an assistant such as a surface active agent, and the like, and it is possible to select cases where portions to be colored are restricted to only the surface portions of the small timber pieces or cases where coloring is effected up to the inside of the small pieces of timber. In addition, at the time of dimension stabilization treatment, it is possible to have the coloring agent dissolved in various liquid resins and effect the coloring treatment simultaneously with the dimension stabilization treatment.

Furthermore, as the resin constituting the colored, opaque resin 3, a thermosetting resin which is in a liquid state prior to hardening such as unsaturated polyester resin, polyurethane resin, diallyl phthalate resin, epoxy resin, silicone resin, phenol resin, and modified acrylic resin is used in the main, and a filler and a coloring agent are added thereto to form the colored, opaque resin 3. As for the filler, calcium carbonate, talc, titanium oxide, silica, glass powders, or the like are used. The amount of compounding of the filler is set up to 100 to 400 parts by weight per 100 parts by weight of the resin solution. In addition, as for the coloring agent, although dyestuffs, pigments, etc. based on yellow, light brown, or brown that are based on a color tone similar to that of the small timber pieces 2 are used preferentially, it is possible to use those having other color tones. The amount to be added may be within an ordinary employed range and need not be specifically restricted.

In addition, with respect to the small timber piece-dispersed, colored, opaque resin layer 4, as shown in FIG. 1, a majority of the small timber pieces 2 are dispersed on the surface side, and one of the surfaces of each of the majority of the small timber pieces 2 is exposed on the surface of the layer 4, and the surface of the layer 4 is made flat. The proportion of the total of the exposed areas of the small timber pieces 2 to the surface area of the layer 4 is set up to 10 to 90%, preferably 70 to 90% or thereabouts. In addition, the thickness of this resin layer 4 is set up to 1 to 2 mm, preferably 1 to 1.5 mm or thereabouts.

With the decorative board having such a structure, the side surfaces of the small timber pieces 2 are exposed on the surface of the small timber piece-dispersed, colored, opaque resin layer 4, and since the revealed that the side surfaces thereof are parallel with the surface of the decorative board, the figure patterns of the small pieces of timber 2 appear on the surface of the decorative board to a maximum, and the effect of the mixing-in of the small timber pieces is improved, so that it is possible to obtain a maximum degree of beauty with a small amount of mixing-in.

Figure 3:
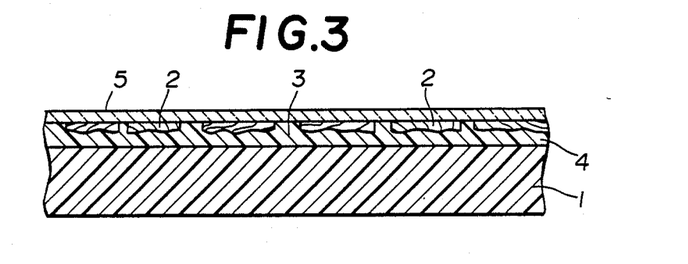
FIG. 3 is a schematic cross-sectional view illustrating a second embodiment of the decorative board in accordance with the present invention.

FIG. 3 shows a second embodiment of the decorative board of this invention, wherein the substrate 1 is provided thereon the small timber piece-dispersed, colored, opaque resin layer 4, on which a transparent resin layer 5 is provided integrally. The transparent resin layer 5 is a colorless or colored, transparent resin layer with a thickness of 50 to 300 μm or thereabouts, and is formed by a method in which a transparent paint consisting of a thermosetting resin such as unsaturated polyester resin, polyurethane resin, diallyl phthalate resin, or epoxy resin is applied, a method in which a transparent resin film or a transparent resin sheet consisting of vinyl chloride resin, acrylic resin, fluororesin or the like is laminated and bonded or pressure-fit, or a like method.

With the decorative board having such a structure, the small timber piece-dispersed, colored resin layer 4 is protected by the transparent resin layer 5, and the moisture absorption by the small timber pieces 2 exposed on the surface of this layer 4 and the staining, abrasion or the like of the surface of the layer 4 are prevented. Since the side surfaces of the small pieces of timber 2 are exposed on the surface of the small timber piece-dispersed, colored, opaque resin layer 4, and the exposed side surfaces are parallel with the surface of the decorative board, the figure patterns of the small timber pieces 2 appear on the surface of the decorative board to a maximum extent, the effect of mixing-in of the small timber pieces is improved, and it is possible to obtain a maximum degree of beauty with a small amount of mixing-in.

Figure 4:
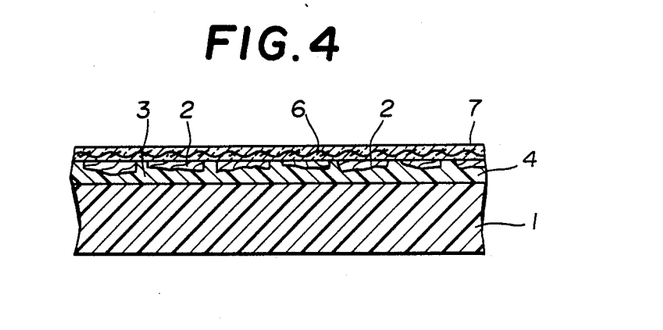
FIG. 4 is a schematic cross-sectional view illustrating a third embodiment of the decorative board in accordance with the present invention.
Figure 5:
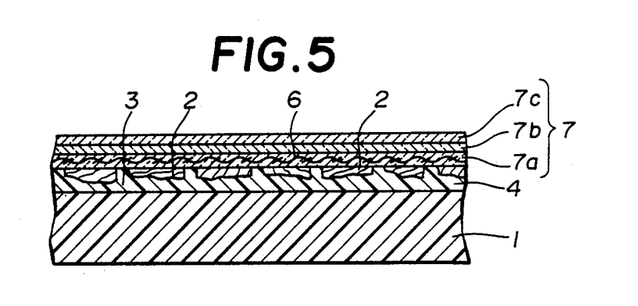
FIG. 5 is a schematic cross-sectional view illustrating a fourth embodiment of the decorative board in accordance with the present invention.

FIGS. 4 and 5, respectively, illustrate third and fourth embodiments of the decorative board of the present invention. In the decorative board shown in FIG. 4, the substrate 1 is provided thereon with the small timber piece-dispersed, colored, opaque resin layer 4, on which a glass fiber-mixed, transparent resin layer 7 with glass fibers 6 mixed therein is provided. The glass fiber-mixed, transparent resin layer 7 is a colorless, transparent or colored, transparent resin layer with a thickness of 50 to 300 μm, and is a type of fiber-reinforced plastic in which the glass fibers 6 of a woven form such as thin glass cloth or surface mat with a thickness of 30 to 100 μm, the thickness being of such an extent that it does not hamper the transparency of the resin, are mixed in a thermosetting resin such as unsaturated polyester resin, polyurethane resin, diallyl phthalate resin, or epoxy resin. In addition, a rate of the glass fibers 6 mixed in the resin is set up to 30 to 200 wt. % or thereabouts.

With the decorative board having such a structure, since the glass fiber-mixed, transparent resin layer 7 becomes a glass fiber-reinforced plastic layer in which the glass fibers 6 are mixed-in, the rigidity of the resin layer 7 itself becomes large. For this reason, the influence of movement caused by the absorption and desorption of moisture by the small timber pieces 2 in the small timber piece-dispersed, colored, opaque resin layer 4, which is a layer below the glass fiber-mixed, transparent resin layer 7, and of movement caused by the hardening and shrinkage of the colored, opaque resin 3 does not appear in the transparent resin layer 7, so that the occurrence of subtle irregularities on the transparent resin layer 7 can be prevented. In addition, since the side surfaces of the small timber pieces 2 are exposed on the surface of the small timber piece-dispersed, colored, opaque resin layer 4, and the exposed side surfaces are parallel with the surface of the decorative board, the figure patterns of the small pieces of timber 2 appear on the surface of the decorative board to a maximum degree, the effect of the addition and mixing-in of the small timber pieces is improved, and it is possible to obtain a maximum degree of beautiful appearance with a small amount of mixing-in.

In the decorative board shown in FIG. 5, the glass fiber-mixed, transparent resin layer 7 has a three-layer structure consisting of a lower layer 7a, an intermediate layer 7b, and a surface layer 7c, and the glass fibers 6 are mixed in the lower layer 7a. In this decorative board, the intermediate layer 7b and the surface layer 7c in the transparent resin layer 7 can be formed by providing usual intermediate coating and finish coating sequentially on the lower layer 7a with the glass fibers 6 mixed therein, and the finished external appearance can be made even more beautiful.

It should be noted that, in each of the embodiments illustrated above, the substrate 1 is provided in each case, but the substrate 1 is not always needed, and it is possible to omit the same and cause the layers to bond directly to a base such as a baseplate.

A specific description will now be made of a method of producing the decorative board in accordance with the present invention.

Firstly, small timber pieces are prepared which are subjected to dimension stabilization treatment, coloring treatment, antiseptic treatment, etc., as required. Meanwhile, a paste-like kneaded composition of an unhardened resin is prepared which comprises a solution of a hardenable resin such as unsaturated polyester resin, epoxy resin, or urethane resin and a filler such as calcium carbonate or talc mixed therewith. The small timber pieces are mixed with this resin mixture, and after mixing, the mixture is molded into a tabular shape, is heated and pressurized using a hot press or the like so as to be made into a cake. Subsequently, the surface of this cake is ground using a sander, the small pieces of timber are thereby exposed on the surface, and the small timber piece-dispersed, colored, opaque resin layer 4 is thus formed and is then bonded to the substrate 1 to be formed into the decorative board. In addition, the decorative board of the object can be obtained if the following procedure is taken: A frame is provided around the substrate, the surface of the substrate is subjected to primer treatment using a primer such as polyurethane resin or epoxy resin to enhance the adhesion, and a mixture of the kneaded resin composition and the small timber pieces is cast onto the substrate surface. After the surface thereof is made flat, the mixture is allowed to harden at room temperature or at an increased temperature so as to be made into a cake, and the surface of this cake is ground with a sanding device.

Figure 6:
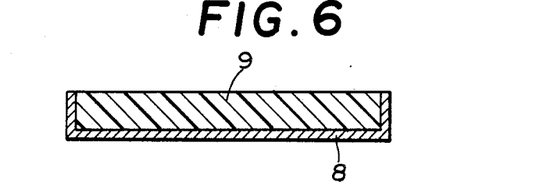
FIGS. 6 to 8 are schematic cross-sectional views illustrating a second embodiment of a method of producing decorative boards in accordance with the present invention.
Figure 7:
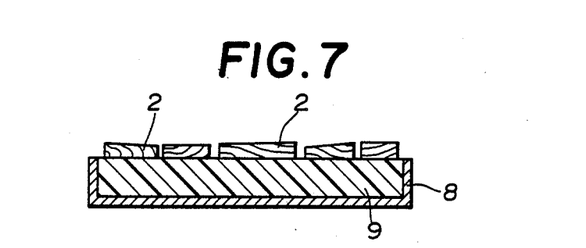
Figure 8:
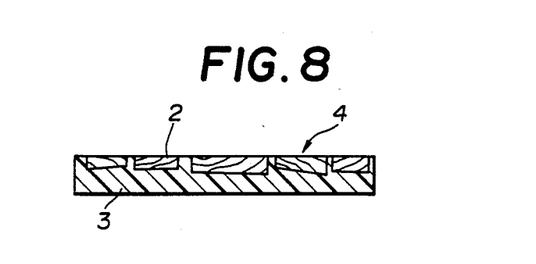

Furthermore, the decorative board can also be produced by a method of production illustrated in FIGS. 6 to 8. Firstly, as shown in FIG. 6, the paste-like kneaded resin composition is poured into a mold 8 with a shallow bottom, the surface is made flat using a silicone roll, a trowel or the like, so as to be formed into a tabular kneaded composition 9. It is, of course, possible to obtain the tabular shape without using the mold 8. The thickness of this tabular material is set up to about 1 to 2 mm, preferably 1 to 1.5 mm or thereabouts.

Subsequently, when the kneaded composition 9 is still unhardened, the small timber pieces 2 are spread on the tabular material, as shown in FIG. 7.

The spreading of the small timber pieces 2 is effected by a method in which a coarse-mesh sieve is used or by a method in which they are directly spread manually, as required. The amount of small timber pieces 2 spread is desirably set up to such a degree that about 10 to 90%, preferably 70 to 90%, of the surface of the tabular material is covered therewith.

After small timber pieces 2 are spread, they are heated and pressurized but before undertaking this step it is possible to leave the tabular kneaded composition 9, after spreading, to stand as it is under the conditions of a temperature of 15° to 30° C. and a period of 3 to 4 hours to accelerate the hardening of the hardenable resin to increase the viscosity of the kneaded composition 9 and facilitate handling and to remove foams contained in the kneaded composition 9.

The heating and pressurization is effected using a known heating and pressurizing means such as a hot press, under the conditions of a pressure of 0.5 to 1.5 MPa, a temperature of 100° to 130° C., and a period of 2 to 5 minutes or thereabouts with a releasing film and a caul placed on the spread small timber pieces 2. As a result of this heating and pressurization, the small timber pieces 2 spread on the tabular kneaded composition 9 are pressure-fed into the kneaded composition 9, the kneaded composition 9 is allowed to harden, and it is possible to obtain a cake in which a majority of the individual small timber pieces 2 are embedded in the kneaded composition 9.

Subsequently, if the surface of the cake is ground by means of various grinding means to make flush the surfaces of the solid resin cake and the embedded small pieces of timber, and the small timber pieces are thus exposed on the surface, a decorative board, such as one shown in FIG. 8, can be obtained.

In addition, as an alternative method, a mold having a tabular mold surface is prepared, and the small pieces of timber are spread on the mold surface. Subsequently, the kneaded resin composition which is made into the colored, opaque resin is poured onto it until the small pieces of timber are concealed thereby, and is similarly subjected to heating and pressurization so as to harden it. The decorative board of the object can be obtained if the cake is then removed from the mold and is bonded to the substrate.

In accordance with such a method of production, it is possible to arrange the small timber pieces 2 directly and uniformly on the kneaded composition 9, and a uniform dispersion of the small timber pieces 2 becomes possible. In addition, the manner of spreading can be adjusted through visual observation, and the small timber pieces 2 can readily be dispersed uniformly. Furthermore, since the small pieces of timber 2 can be concentrated in the surface of the mixture 9, even if the amount of the small timber pieces 2 is reduced, it is possible to obtain a decorative board in which the figure patterns appear in abundance on the surface, and the amount of the small timber pieces 2 used can be reduced.

Figure 9:
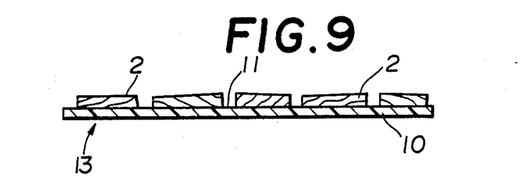
FIGS. 9 to 13 are schematic cross-sectional views illustrating a third embodiment of the method of producing decorative boards in accordance with the present invention.

Furthermore, it is also possible to produce the decorative board of the present invention by using a method illustrated in FIGS. 9 to 13. In this method, the small pieces of timber are arranged by making use of an adhesive sheet. Firstly, as shown in FIG. 9, the small timber pieces 2 are arranged on an adhesive surface 11 of an adhesive sheet 10, and the small timber pieces 2 are allowed to bond to the adhesive sheet 10. An ordinary adhesive sheet in which an adhesive is applied to the surface of a foundation is used as the adhesive sheet 10 used herein. The arrangement of the small timber pieces 2 is effected, as required, by a method in which spreading is effected using a coarse-mesh sieve, a method in which they are manually laid directly on the adhesive sheet 10, or a like method. The amount of small pieces of timber 2 arranged is set up to such a degree that about 10 to 90%, preferably 70 to 90%, of the adhesive surface 11 of the adhesive sheet 10 is covered therewith.

Figure 10:
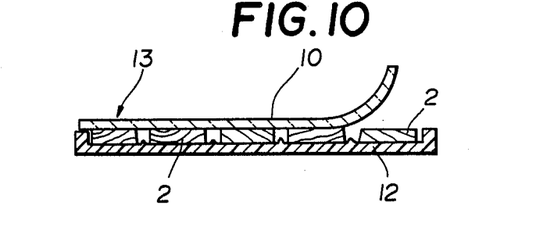

In addition, as shown i FIG. 10, it is also possible to adopt a method in which a frame 12 provided with small protrusions for facilitating the positioning of the small pieces of timber 2 is prepared, the small timber pieces 2 are arranged on the frame 12, and they are pressurized with the adhesive sheet 10 so as to cause the small timber pieces 2 to be bonded to the adhesive surface 11 of the adhesive sheet 10. In this method, if such a pattern frame for positioning is used as the frame 12, the arrangement of the small pieces of timber 2 becomes fixed, and a decorative board having a uniform surface pattern can be obtained.

As a result, it is possible to obtain a sheet-like material 13 with small timber pieces bonded thereto in which the multiplicity of small timber pieces 2 are arranged on and bonded to the adhesive sheet 10.

Meanwhile, apart from the sheet-like material 13, a kneaded composition which is composed of a hardenable resin solution mixed with a filler is prepared.

Figure 11:
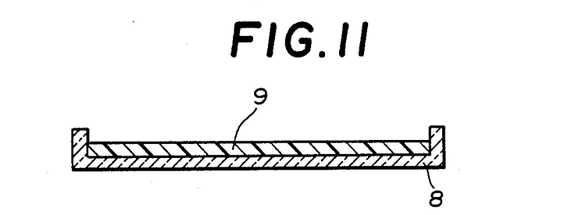

Subsequently, as shown in FIG. 11, this kneaded composition is poured into the mold 8 with a shallow bottom, and the surface thereof is flattened by using a silicone roll or a trowel to obtain the tabular kneaded composition 9. Of course, the kneaded composition 9 may be made into a tabular shape without using the mold 8. The thickness of this tabular material is about 1 to 2 mm, preferably 1 to 1.5 mm or thereabouts.

Figure 12:
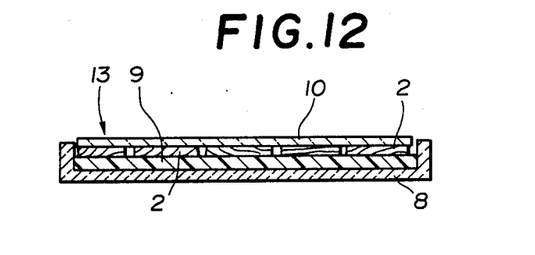

Subsequently, while the tabular kneaded composition 9 is still unhardened, as shown in FIG. 12, the sheet-like material with the small timber pieces bonded thereto is superposed on the tabular kneaded composition 9 in such a manner that the small timber pieces 2 are brought into contact with the tabular kneaded composition 9, is lightly pressurized to join them. If the adhesive sheet 9 alone is released, the small pieces of timber 2 remain on the surface of the tabular kneaded composition 9, and thus the small timber pieces 2 are transferred to the tabular kneaded composition 9. At that time, it is preferable to release the adhesive sheet 10 after the sheet-like material 13 with the small timber pieces bonded thereto and the tabular kneaded composition 9 are superposed on each other and are then allowed to stand for several hours to accelerate the hardening of the resin solutions and increase the viscosity of the kneaded composition 9, and after the movement of the small timber pieces 2 is constrained to some degree. As a result, the small pieces of timber 2 do not move, so that handling is facilitated.

Subsequently, this material is subjected to heating and pressurization to allow the resin to harden. The heating and pressurization are effected using a known heating and pressurizing means such as a hot press under the conditions of a pressure of 0.5 to 1.5 MPa, a temperature of 100° to 130° C., and a period of 2 to 5 minutes or thereabouts with the releasing film and a alcaul placed on the small timber pieces 2 on the tabular kneaded composition 9. As a result of this heating and pressurization, the small timber pieces 2 on the tabular kneaded composition 9 are pressure-fed into the kneaded composition 9, the kneaded composition 9 is allowed to harden, and it is possible to obtain a cake in which a majority of the individual small timber pieces 2 are embedded in the kneaded composition 9.

Figure 13:
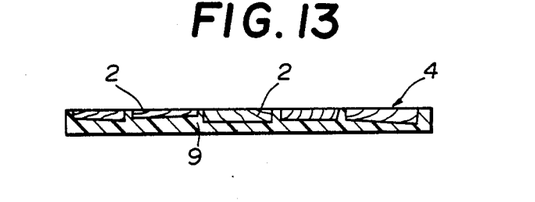

Subsequently, if the surface of the cake is ground by means of various grinding means to make the surfaces of the small timber pieces to be exposed on the surface, a decorated board, such as one shown in FIG. 13, can be obtained.

In accordance with this method of production, the small pieces of timber 2 are bonded to the adhesive sheet 10 and is superposed on the tabular kneaded composition 9, and the small pieces of timber 2 are transferred to the kneaded composition 9. The small timber pieces 2 can be transferred to the tabular kneaded composition 9 without impairing the state of arrangement of the small timber pieces 2, the operation can be effected stably and readily, and the manner of the arrangement of the small timber pieces 2 can be adjusted through visual observation, with the result that a uniform dispersion of the small timber pieces 2 becomes possible. In addition, the small timber pieces 2 do not sink deeply into the tabular kneaded composition 9, and can be arranged on the surface thereof in a concentrated manner, so that even if the amount of the small timber pieces 2 used is reduced, it is possible to obtain a decorative board having a beautiful surface.

The transparent film layer 5 can be formed on the surface of the small timber piece-dispersed, colored, opaque resin layer 4 of the decorative board thus obtained, by a method in which a transparent paint is applied, a method in which a transparent resin film or a transparent resin sheet is bonded. The following method is available as an alternative method of forming the transparent resin layer 5. Firstly, a mold having a tabular mold surface is prepared, a transparent paint which is to constitute the transparent resin layer is applied to this mold surface, the small timber pieces are spread thereon while this paint is not yet dry, and the side surfaces of the small timber pieces are aligned with the coated surface.

Subsequently, the resin composition which is to constitute the colored, opaque resin is poured to it until the small timber pieces are concealed thereby, and is similarly heated and pressurized to harden it. After the cake is released from the mold, the cake is bonded to the substrate, as required, to obtain the decorative board of the object.

Furthermore, the glass fiber-mixed, transparent resin layer 7 can be formed on the small timber piece-dispersed, colored, opaque layer 4 of the decorative board thus obtained, as follows: Namely, after the glass fibers 6 are placed on the surface of the small timber piece-dispersed, colored, opaque layer 4, the resin solution, which is to constitute the transparent resin layer 5, is poured thereonto. Subsequently, a plastic film is placed on this resin solution, and this plastic film is pressed with a roll or the like, so as to cause the glass fibers 6 to be impregnated with the resin solution and to remove residual foams, and, at the same time, to allow the resin solution to flow into fine recesses and voids present in the surface of the small timber piece-dispersed, colored, opaque layer 4. Subsequently, the resin solution is allowed to harden to obtain the glass fiber-mixed, transparent resin layer 7 in which the glass fibers 6 are mixed. Furthermore, if several coats of transparent paint are applied thereto, or several transparent resin films or transparent resin sheets are bonded thereto, the glass fiber-mixed, transparent resin layer 7 with a composite structure can be obtained.

It should be noted that, although the tabular shape is typical as the configuration of the decorative board in accordance with the present invention, the configuration is not necessarily be restricted to the tabular shape, and a two-dimensional shape such as a spherical surface, or a shape having a complicated curved surface by combining them may be used.

(First Embodiment)

A kneaded composition in the form of a paste was prepared in which 300 parts by weight of calcium carbonate and one part by weight of a yellow pigment were compounded with 100 parts by weight of an unhardened solution of unsaturated polyester resin.

Meanwhile, beech, Japanese oak and the like were cut into small pieces with a width of 10 to 20 mm, a length of 10 to 20 mm, and a thickness of 1 to 1.5 mm, and after being allowed to dry, they were immersed in the unhardened solution of unsaturated polyester resin so as to be impregnated with the resin solution. The impregnated small timber pieces were left to stand at room temperature, and the small timber pieces which assumed a semi-hardened state were mixed in the above-described kneaded composition, the resulting mixture was poured into a mold and was flattened with a roll to be formed into a tabular shape with a thickness of 1.5 mm. Subsequently, after being left to stand for 3 hours at room temperature, they were subjected to heating and pressurization with a hot press at a pressure of 1.0 MPa, at a temperature of 100° C., and for 5 minutes to obtain a cake. This cake was ground using a sander to cause the small timber pieces to be exposed on the surface. Subsequently, this cake was bonded to the substrate of 2 mm-thick lauan plywood to obtain a decorative board. An unsaturated polyester resin-based paint was applied to the surface of the decorative board, and a film with a thickness of about 100 m was formed. In the decorative board thus obtained, the figure patterns of the small timber pieces appeared on the surface, and showed a beautiful external appearance.

(Second Embodiment)

A kneaded composition in the form of a paste was prepared in which 400 parts by weight of calcium carbonate and 1 part by weight of a yellow pigment were compounded with 100 parts by weight of unhardened solution of unsaturated polyester resin.

Meanwhile, beech, Japanese oak and the like were cut into small pieces with a width of 10 to 20 mm, a length of 10 to 20 mm, and a thickness of 1 to 1.5 mm, and after being allowed to dry, they were immersed in the unhardened solution of unsaturated polyester resin so as to be impregnated with the resin solution. The impregnated small timber pieces were left to stand at room temperature and the small timber pieces which assumed a semi-hardened state were mixed in the above-described mixture. Meanwhile, after a polyurethane resin-based primer was applied to a 2 mm-thick lauan plywood (50 cm square) as a substrate, a frame was provided around the periphery thereof, and the above-described mixture was poured thereinto and was flattened with a roll to be formed into a tabular shape with a thickness of 1.5 mm. Subsequently, after being left to stand for 3 hours at room temperature, they were subjected to heating and pressurization with a hot press at a pressure of 1.0 MPa, at a temperature of 10° C., and for 5 minutes to obtain a cake. This cake was ground using a sander to cause the small timber pieces to be exposed on the surface. Subsequently, an unsaturated polyester resin-based paint was applied to that surface, and a film with a thickness of about 100 μm was formed, thereby obtaining a decorative board.

In the decorative board thus obtained, the figure patterns of the small timber pieces appeared on the surface and showed a beautiful external appearance.

(Third Embodiment)

A kneaded composition in the form of a paste was prepared in which 300 parts by weight of calcium carbonate and 1 part by weight of a yellow pigment were compounded with 100 parts by weight of an unhardened solution of unsaturated polyester resin.

Meanwhile, beech, Japanese oak and the like were cut into small pieces with a width of 5 to 7 mm, a length of 7 to 12 mm, and a thickness of 1 to 1.5 mm, and after being allowed to dry, they were immersed in the unhardened solution of unsaturated polyester resin so as to be impregnated with the resin solution. The impregnated small timber pieces were left to stand at room temperature, and the small timber pieces which assumed a semi-hardened state were mixed in the above-described kneaded composition, the resulting mixture was poured into a mold and was flattened with a roll to be formed into tabular shape with a thickness of 1.5 mm. Subsequently, after being left to stand for 3 hours at room temperature, they were subjected to heating and pressurization with a hot press at a pressure of 1.0 MPa, at a temperature of 100° C., and for 5 minutes to obtain a cake. A surface mat (glass fibers) with a weighing capacity of 50 g/m² was then placed on the surface thereof, about 100 g/m² of an unhardened solution of transparent, unsaturated polyester resin was poured on it, and a fluoroplastic film was placed thereon and was pressurized by a roll. Subsequently, the unsaturated polyester resin was allowed to harden upon heating at a temperature of 100° C. for 10 minutes. Subsequently, after the fluoroplastic film was released, the surface was lightly ground, an unsaturated polyester resin-based paint was applied thereto, and a transparent resin layer with glass fibers having a total thickness of about 200 μm was formed. This was bonded to 2 mm-thick lauan plywood so as to obtain a decorative board.

In the decorative board thus obtained, the figure patterns of the small timber pieces appeared on the surface, and the coated surface at the surface was smooth, displaying a beautiful external appearance.

(Fourth Embodiment)

300 parts by weight of calcium carbonate and 1 part by weight of a yellow pigment were compounded and mixed with 100 parts by weight of an unhardened solution of unsaturated polyester resin, and the mixture was then poured into a mold 1, and was flattened by a roll to obtain the tabular kneaded composition 2 having a thickness of 1.5 mm.

Meanwhile, beech, Japanese oak and the like were cut into small pieces with a width of 10 to 20 mm, a length of 10 to 20 mm, and a thickness of 1 to 1.5 mm, and after being allowed to dry, they were immersed in the unhardened solution of unsaturated polyester resin so as to be impregnated with the resin solution. The impregnated small timber pieces were left to stand ar room temperature, and the small timber pieces which assumed a semi-hardened state were manually spread on the tabular kneaded composition 1. In terms of the amount of spreading, the small timber pieces were arranged uniformly in such a manner that 85 to 90% of the entire surface of the kneaded composition was concealed thereby. After being left to stand for 3 hours at room temperature of 100° C., and for 5 minutes to obtain a cake. This cake was ground using a sander to cause the small timber pieces to be exposed on the surface. Subsequently, an unsaturated polyester resin-based paint was applied to that surface to form an about 100 μm-thick film, the material was bonded to a 2 mm-chick lauan plywood as substrate to obtain a decorative board. In the decorative board thus obtained, the figure patterns of the small timber pieces appeared on the surface, and showed a beautiful external appearance.

(Fifth Embodiment)

400 parts by weight of calcium carbonate and 1 part by weight of a yellow pigment were compounded and mixed with 100 parts by weight of an unhardened solution of unsaturated polyester resin, and the mixture was then poured into a mold, and was flattened by a roll to obtain the tabular kneaded compound 2 having a thickness of 1.5 mm.

Meanwhile, beech, Japanese oak and the like were cut into small pieces with a width of 10 to 20 mm, a length of 10 to 20 mm, and a thickness of 1 to 1.5 mm, and after being allowed to dry, they were immersed in the unhardened solution of unsaturated polyester resin so as to be impregnated with the resin solution. The impregnated small timber pieces were left to stand at room temperature, and the small pieces of timber which assumed a semi-hardened state were manually spread and arranged on an adhesive sheet. In terms of the amount of spreading, the small timber pieces were arranged uniformly in such a manner that 85 to 90% of the entire surface of the adhesive sheet was concealed thereby. This material was superposed on the abovedescribed tabular kneaded compound and was lightly pressurized with a roll, and, after being left to stand for 3 at a room temperature, the adhesive sheet was released. Subsequently, the material was subjected to heating and pressurization with a hot press at a pressure of 1 MPa, at a temperature of 100° C., and for 5 minutes to obtain a cake. Certain surfaces of the small pieces of timber 2 were ground using a sander, and an unsaturated polyester resin-based paint was applied thereto, thereby obtaining a beautiful decorative board with a thickness of about 1.5 mm.

What is claimed is:

1. A decorative board, comprising a colored, opaque resin layer with a multiplicity of small pieces of timber dispersed therein, wherein said small timber pieces in said colored, opaque resin layer are arranged substantially in a single layer with one of the side surfaces of each of said small timber pieces being exposed on the surface of said resin layer, and said surface is substantially flat.

2. A decorative board, comprising a colored, opaque resin layer with a multiplicity of small pices of timber dispersed therein and a transparent resin layer provided on said colored, opaque resin layer, wherein said small pieces of timber in said resin layer are exposed on the surface of said resin layer, and said surface is substantially flat.

3. A decorative board as defined by claim 2, wherein the small timber pieces in the resin layer are arranged substantially in a single layer.

4. A decorative board comprising a substrate, a colored, opaque resin layer disposed on said substrate and provided with a multiplicity of small pieces of timber dispersed therein, and a transparent resin layer provided on said colored, opaque resin layer, wherein said small pieces of timber in said colored, opaque resin layer are exposed on the surface thereof, and said surface is substantially flat.

5. A decorative board comprising a colored, opaque resin layer with a multiplicity of small pieces of timber dispersed therein and a transparent resin layer which is provided on said colored, opaque resin layer an in which glass fibers are mixed therein, wherein said small pieces of timber in said colored, opaque resin layer are exposed on the surface of said layer, and said surface is substantially flat.

6. A decorative board according to claims 1 to 5, wherein said small timber pieces are subjected to dimension stabilization treatment.

7. A decorative board according to claims 1 to 5, wherein said small timber pieces are partially or wholly subjected to coloring treatment.

8. A decorative board according to claims 1 to 5, wherein a resin which constitutes said colored, opaque resin layer is a thermosetting resin.

9. A decorative board according to claim 5, wherein said transparent resin layer is constituted by a multi-layered structure, and glass fibers are mixed at least in a lowermost layer thereof.

* * * * *